2,875,205
Patented Feb. 24, 1959

2,875,205

DICARBOXYLIC ACID-MONOPIPERAZIDES AND A PROCESS FOR THEIR MANUFACTURE

Heinrich Ruschig and Walter Siedel, Bad Soden (Taunus), Heinrich Leditschke and Manfred Schorr, Frankfurt am Main, Dieter Schmidt-Barbo, Hofheim (Taunus), and Georg Lammler, Frankfurt am Main, Germany, assignors to Farbwerke Hoechst Aktiengesellschaft vormals Meister Lucius & Brüning, Frankfurt am Main, Germany, a corporation of Germany No Drawing. Application October 19, 1956
Serial No. 616,924

Claims priority, application Germany October 29, 1955

7 Claims. (Cl. 260—268)

It is known that certain piperazine derivatives, for example, 1-diethyl-carbamino-4-methyl-piperazine, are especially useful for the control of filaria. Dicarboxylic acid mono-4-methyl-piperazide derivatives are also known, see for example, Bull. Soc. Chim. Belges 59 (1950), page 228.

Now we have found that monopiperazides of dicarboxylic acids with 1-(3'-halogen-4'-methyl-phenyl)-piperazines are active against schistosomiasis.

In addition to providing the aforesaid mono-piperazides as new compounds possessing the aforesaid property, the present invention provides a process for their manufacture, wherein a 1-(3'-halogen-4'-methyl-phenyl)-piperazine is reacted with a dicarboxylic acid or a reactive derivative thereof, and, if desired, a compound so obtained and containing no free carboxyl group may be hydrolysed to form the monopiperazide containing a free carboxyl group or a compound so obtained and containing a free carboxyl group may be esterified or converted into a metal salt thereof.

The 1-(3'-halogen-4'-methyl-phenyl)-piperazine used as starting material may be obtained, for example, from the corresponding toluidine either by condensation with diethanolamine or a reactive ester thereof or by building up the piperazine ring in stages or by introducing the piperazine ring into an appropriately substituted toluene.

The halogen atom in ortho-position to the methyl group in the phenyl nucleus may be any halogen atom, but is preferably chlorine.

As dicarboxylic acids there are suitable those of aliphatic, aromatic or unsaturated heterocyclic character. In the case of aliphatic dicarboxylic acids the carbon chain may be interrupted by a hetero atom, e. g. oxygen or sulphur.

However, a carbon chain need not be present. There may be mentioned, for example, the following dicarboxylic acids: oxalic acid, malonic acid, succinic acid, glutaric acid, adipic acid, maleic acid, fumaric acid, tartaric acid, aspartic acid, glutamic acid, diglycolic acid, thiodiglycolic acid, phthalic acid and isomers thereof, or pyridine dicarboxylic acids.

Instead of the free dicarboxylic acids there can also be used reactive derivatives thereof, for example, esters, anhydrides, halides, azides or nitriles thereof. As ester components there come into consideration alcohols having an alkyl radical with a straight or a branched chain containing up to 5 carbon atoms.

The process of the present invention may be carried out by reacting an appropriately substituted phenylpiperazine with a dicarboxylic acid ester, and subsequently hydrolysing the piperazide ester so obtained. It is advantageous to carry out the reaction in the presence of an organic solvent such, for example, as an alcohol of low molecular weight, at room temperature or moderately low or raised temperature.

In the case of dicarboxylic acids which form cyclic anhydrides it is advantageous to react the substituted phenyl-piperazine in the absence or in the presence of a solvent with the anhydride of the dicarboxylic acid. As solvents there are suitable, besides water, also organic solvents, preferably ketones, such as acetone, or aromatic hydrocarbons such as benzene or toluene. The reaction can be carried out at a temperature between 10° C. and 200° C., and it is advantageous to work at the boiling temperature of the solvent used, or in the absence of a solvent preferably between 100° C. and 150° C.

An alternative method is to treat the appropriately substituted phenyl-piperazine with an ester-chloride of the dicarboxylic acid. In this case it is advantageous to work in the presence of an inert solvent. The reaction may be carried out with or without the addition of an acid-binding agent. As solvents there may be used, for example, halogen-hydrocarbons, aliphatic ketones or ethers or aromatic hydrocarbons. As acid-binding agents there may be used inorganic compounds, such as sodium carbonate, calcium carbonate or calcium oxide, or there may be used organic bases, such as pyridine. The piperazide esters obtained in this manner may be hydrolyzed, for example, by means of an alcoholic solution of potassium hydroxide, to form the corresponding dicarboxylic acid monopiperazides.

The process may also be carried out by slowly introducing the substituted phenyl-piperazine into the dicarboxylic acid dihalide. By subsequently adding water the desired dicarboxylic acid monopiperazide is obtained directly.

Another method consists in heating the appropriately substituted phenylpiperazine with the dicarboxylic acid at a temperature up to about 200° C. in the absence of a solvent.

The compounds obtained by the process of the invention are generally colourless crystalline products most of which are readily soluble in alkalies and alcohols, but are sparingly soluble in water and in most other organic solvents, and which form with inorganic bases, especially solutions of alkali metal hydroxides, for example, sodium hydroxide, readily water-soluble salts.

The new compounds of this invention are valuable medicaments which are especially suitable for the control of schistosome infections. The new compounds, by virtue of their special activity are considerably superior to the known compounds of similar constitution, for example, the compounds already mentioned in the opening paragraph of this specification.

The following examples illustrate the invention, but they are not intended to limit it thereto.

EXAMPLE 1

*Phthalic acid mono-4(3'-chloro-4'-methyl-phenyl)-piperazide*

To a hot solution of 14.8 grams of phthalic anhydride in 100 cc. of benzene there is added a solution of 21.1 grams of 1-(3'-chloro-4'-methyl-phenyl)-piperazine (colourless oil boiling at 136–137° C. under a pressure of 0.5 mm. of mercury; its hydrochloride melts at 201° C.) in 50 cc. of benzene. The reaction mixture is heated for one hour on the steam bath. After cooling there are obtained 35 grams of phthalic acid mono-4-(3'-chloro-4'-methyl-phenyl)-piperazide melting at 196° C.

EXAMPLE 2

*Pyridine-2,3-dicarboxylic acid-mono-4-(3'-chloro-4'-methyl-phenyl)-piperazide*

To a boiling solution of 15 grams of pyridine-2,3-dicarboxylic anhydride in 150 cc. of benzene there is added dropwise a solution of 21 grams of 1-(3'-chloro-4'-methyl-phenyl)-piperazine in 50 cc. of benzene, and the mixture is heated for one hour on the steam bath. By adding, after cooling, about 200 cc. of petroleum ether the reaction product is precipitated as a viscous oil from which the solvent is decanted off. The reaction product is then taken up in methylene chloride, the solution is washed with dilute acetic acid and water, dried over sodium sulphate, and the methylene chloride is distilled off. The viscous product which remains is covered with petroleum ether, triturated well, and filtered with suction. There is obtained pyridine-2,3-dicarboxylic acid mono-4-(3'-chloro-4'-methyl-phenyl)-piperazide in the form of a brownish amorphous powder which agglutinates when heated at temperatures above about 75° C. and which decomposes above 100° C.

EXAMPLE 3

*Maleic acid mono-4-(3'-chloro-4'-methyl-phenyl)-piperazide*

To 14.8 grams of maleic anhydride in 140 cc. of benzene there is added dropwise at 30° C. while stirring a solution of 31.6 grams of 1-(3'-chloro-4'-methyl-phenyl)-piperazine in 60 cc. of benzene. The reaction mixture is allowed to stand for two days, and the crystalline precipitate is filtered off with suction and recrystallized from ethyl acetate. There are obtained 44 grams of maleic acid mono-4-(3'-chloro-4'-methyl-phenyl)-piperazide, melting at 145–146° C. The methyl ester of maleic acid mono-4-(3'-chloro-4'-methyl-phenyl)-piperazide prepared with diazo-methane melts at 56–57° C. after recrystallization from ether.

EXAMPLE 4

*Succinic acid mono-4-(3'-chloro-4'-methyl-phenyl)-piperazide*

To 15 grams of succinic anhydride in 140 cc. of benzene there is added at 75–80° C. a solution of 31.6 grams of 1-(3'-chloro-4'-methyl-phenyl)-piperazine in 60 cc. of benzene, and the reaction mixture is then maintained for 15–30 minutes at 80° C. After evaporating the benzene the residue crystallizes when triturated with ethyl acetate. After being repeatedly recrystallized from ethyl acetate or acetone, the resulting succinic acid mono-4-(3'-chloro-4'-methyl-phenyl)-piperazide melts at 115° C., the yield being 23.8 grams.

EXAMPLE 5

*Oxalic acid mono-4-(3'-chloro-4'-methyl-phenyl)-piperazide*

(a) OXALIC ACID ETHYL ESTER 4-(3'-CHLORO-4'-METHYL-PHENYL)-PIPERAZIDE 25 cc. of dry pyridine and 40 grams of 1-(3'-chloro-4'-methyl-phenyl)-piperazine are dissolved in 100 cc. of dry chloroform, and to the solution there is added slowly, while stirring at 5–10° C., a solution of 26 grams of ethoxalyl chloride in 25 cc. of chloroform. After being allowed to stand for a short time at 20° C., the clear solution is diluted with chloroform, washed with 1 N-hydrochloric acid and potassium bicarbonate solution, and the solvent is evaporated after drying. There is obtained a residue of 55 grams of a crystalline crude product, which can be purified by a distillation under reduced pressure. It boils at 210° C. under a pressure of 0.4 mm. of mercury. After recrystallization from cyclohexane, the oxalic acid ethyl ester 4-(3'-chloro-4'-methyl-phenyl)-piperazide melts at 53–55° C.

(b) OXALIC ACID MONO-4-(3'-CHLORO-4'-METHYL-PHENYL)-PIPERAZIDE

To a solution of 32.5 grams of oxalic acid ethyl ester 4-(3'-chloro-4'-methyl-phenyl)-piperazide in 150 cc. of ethyl alcohol there is added a solution of 9 grams of potassium hydroxide in 20 cc. of water diluted with 30 cc. of ethyl alcohol. After 2 hours the crystalline precipitate formed is filtered off with suction, and recrystallized twice from a mixture of ethyl alcohol and water in a ratio 9:1. There are obtained 25 grams of the potassium salt of oxalic acid mono-4-(3'-chloro-4'-methyl-phenyl)-piperazide, which crystallizes with 1 mol of water and decomposes at 298–299° C.

EXAMPLE 6

*Maleic acid mono-4-(3'-bromo-4'-methyl-phenyl)-piperazide*

44.7 grams of 1-(3'-bromo-4'-methyl-phenyl)-piperazine in an oil (boiling at 135–136° C. under a pressure of 0.2 mm. of mercury; its hydrochloride melts at 222° C.) are added dropwise, while stirring, at 10–15° C. to a solution of 19 grams of maleic anhydride in 200 cc. of benzene. After allowing the mixture to stand for 24 hours at 20° C., the crude product is filtered off with suction and recrystallized from ethyl alcohol. There are obtained 42 grams of maleic acid mono-4-(3'-bromo-4'-methyl-phenyl)-piperazide melting at 155–156° C.

EXAMPLE 7

*Adipic acid methyl ester 4-(3'-chloro-4'-methyl-phenyl)-piperazide*

A mixture of 42 grams of 1-(3'-chloro-4'-methyl-phenyl)-piperazine and 50 grams of adipic acid are heated in an open vessel for 4 hours at 160° C. After being cooled the mixture is taken up in 2 N-sodium hydroxide solution, the undissolved matter is filtered off, and the filtrate is decolourized with charcoal and acidified with glacial acetic acid. By taking up in benzene, thoroughly washing the solution with water and drying it and evaporating the solvent, there are obtained 39 grams of a crude product, which, after recrystallization twice from ethyl acetate, yields 28 grams of adipic acid mono-4-(3'-chloro-4'-methyl-phenyl)-piperazide melting at 103–104° C. By methylating this product with diazomethane and recrystallizing it from a mixture of benzene and ether, there are obtained 21.1 grams of adipic acid methyl ester 4-(3'-chloro-4'-methyl-phenyl)-piperazide melting at 103–104° C.

EXAMPLE 8

*Adipic acid mono-4-(3'-chloro-4'-methyl-phenyl)-piperazide*

To a solution of 64 grams of crude adipic acid dichloride in 100 cc. of dry benzene there is added dropwise at 5° C. a solution of 67 grams of 1-(3'-chloro-4'-methyl-phenyl)-piperazine in 250 cc. of benzene. After allowing the mixture to stand for a short time water is added, the solution is rendered alkaline with sodium hydroxide and the aqueous phase is separated from the benzene phase and the undissolved material. By acidifying the aqueous phase with glacial acetic acid and extraction with benzene, there are obtained 19.5 grams of crude adipic acid mono-4-(3'-chloro-4'-methyl-phenyl)-piperazide, which, when recrystallized from ethyl acetate, melts at 103° C.

EXAMPLE 9

*Malonic acid methyl ester 4-(3'-chloro-4'-methyl-phenyl)-piperazide*

90 grams of 1-(3'-chloro-4'-methyl-phenyl)-piperazine are dissolved in 110 cc. of malonic acid dimethyl ester, and the solution is heated for 24 hours at 60° C. The excess of the ester is distilled off under a pressure of 0.5 mm. of mercury, the oily residue (107 grams) is dissolved in 400 cc. of ethyl alcohol, and to the solution are added 16 grams of NaOH dissolved in 30 cc. of water and diluted with 50 cc. of ethyl alcohol. The sodium salt of malonic acid mono-4-(3'-chloro-4'-methyl-phenyl)-piperazide, which crystallises rapidly, is filtered off with suction, allowing the mixture to stand for a short time, washed with ethyl alcohol, and decomposed by dissolving it in water and adding acetic acid. There are obtained about 44 grams of malonic acid mono-4-(3'-chloro-4'-methyl-phenyl)-piperazide which, after recrystallization from methanol, melts at 133° C. (with decomposition). The methyl ester of the latter acid cannot be crystallized or distilled. It can be obtained in a pure form as a nearly colourless viscous oil by methylation with diazomethane.

EXAMPLE 10

*Glutaric acid mono-4-(3'-chloro-4'-methyl-phenyl)-piperazide*

To a solution of 65 grams of glutaric anhydride in 430 cc. of dry benzene there are rapidly added dropwise 120 grams of 1-(3'-chloro-4'-methyl-phenyl)-piperazine dissolved in 200 cc. of benzene, during which the temperature rises to 50° C. The clear solution is boiled under reflux for 1–2 hours, cooled, washed with 0.5 N-hydrochloric acid and water, and the solvent is evaporated. The residue crystallizes after the addition of a few crystals of a previously prepared sample of this product. By repeated recrystallization from ethyl acetate, 83 grams of glutaric acid mono-4-(3'-chloro-4'-methyl-phenyl)-piperazide melting at 98–99° C. are obtained. The methyl ester obtained by methylation with diazomethane melts at 67–68° C. after recrystallization from ether.

EXAMPLE 11

*Terephthalic acid mono-4-(3'-chloro-4'-methyl-phenyl)-piperazide*

56 grams of terephthalic acid dichloride are dissolved in 350 cc. of benzene, a solution of 58 grams of 1-(3'-chloro-4'-methyl-phenyl)-piperazine in 50 cc. of benzene is added dropwise, and the mixture is stirred for 1 hour. To thick magma so formed there are added about 100 cc. of water, and the reaction mixture is boiled for a short time, while stirring, and the undissolved terephthalic acid bis-4-(3'-chloro-4'-methyl-phenyl)-piperazide is filtered off with suction. To the filtrate sodium hydroxide solution is added until the reaction becomes alkaline, the mixture is agitated, the aqueous layer is separated, and the terephthalic acid mono-4-(3'-chloro-4'-methyl-phenyl)-piperazide is precipitated by adding dilute acetic acid. By recrystallizing the product from a mixture of alcohol and water, it is obtained as a yellowish powder melting at 155–157° C. (with decomposition).

EXAMPLE 12

*Succinic acid mono-4-(3'-chloro-4'-methyl-phenyl)-piperazide*

15 grams of succinic anhydride and 31 grams of 1-(3'-chloro-4'-methyl-phenyl)-piperazine are heated in an open flask on a steam bath for 2 hours. The clear melt is dissolved in 30 cc. of ethyl acetate, and the crystals formed on cooling are filtered off with suction. After recrystallization from a little ethyl acetate, there are obtained 23 grams of succinic acid mono-4-(3'-chloro-4'-methyl-phenyl)-piperazide in the form of colourless crystals melting at 115–119° C.

EXAMPLE 13

*Diglycollic acid mono-4-(3'-chloro-4'-methyl-phenyl)-piperazide*

To a solution of 23.2 grams of diglycollic anhydride in 150 cc. of boiling benzene is added dropwise a solution of 42 grams of 1-(3'-chloro-4'-methyl-phenyl)-piperazine in 50 cc. of benzene, the mixture is heated under reflux for 30 minutes, cooled, and the crystals which separate out are filtered off with suction. The diglycollic acid mono-4-(3'-chloro-4'-methyl-phenyl)-piperazide can be recrystallized from ethyl alcohol and melts at 147–151° C. The yield is 43 grams.

EXAMPLE 14

*Thiodiglycollic acid mono-4-(3'-chloro-4'-methyl-phenyl)-piperazide*

To a solution of 26.4 grams of thiodiglycollic anhydride in 150 cc. of boiling benzene is added dropwise a solution of 42 grams of 1-(3'-chloro-4'-methyl-phenyl)-piperazine in 50 cc. of benzene, and the mixture is heated at the boil for one hour. After cooling the mixture there is slowly added thereto about twice its volume of petroleum ether, whereby a viscous oil is precipitated which solidifies after prolonged standing. The precipitate is filtered off with suction and recrystallized from a little ethyl acetate. There is obtained thiodiglycollic acid mono-4-(3'-chloro-4'-methyl-phenyl)-piperazide in the form of colourless crystals melting at 102–104° C.

We claim:

1. A member selected from the group consisting of dicarboxylic acid-monopiperazides of the general formula:

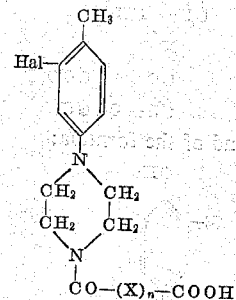

wherein Hal represents a member selected from the group consisting of chlorine and bromine, X represents a member selected from the group consisting of lower alkylene, dimethylene ether, dimethylene thioether, lower alkenylene, phenylene and pyridine groups, $n$ represents a number selected from the group consisting of 0 and 1, and lower alkyl esters and non-toxic metal salts of the acids of the above formula.

2. The compound of the formula:

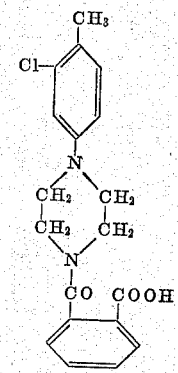

3. The compound of the formula:

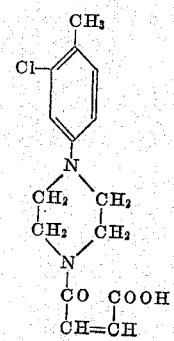

4. The compound of the formula:

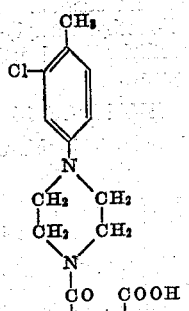

5. The compound of the formula:

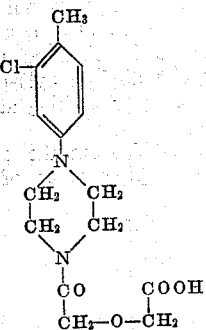

6. The compound of the formula:

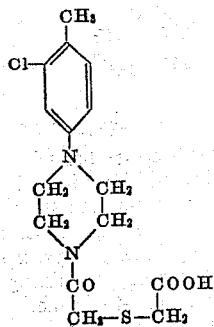

7. In the process for preparing a member selected from the group consisting of dicarboxylic acid-monopiperazides and lower alkyl esters and non-toxic metal salts thereof, said dicarboxylic acid-monopiperazides having the general formula:

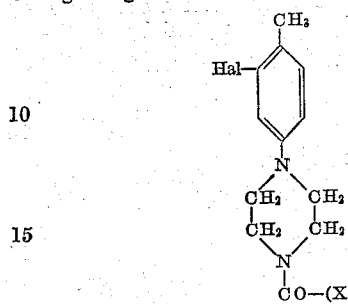

wherein Hal represents a member selected from the group consisting of chlorine and bromine, X represents a member selected from the group consisting of lower alkylene, dimethylene ether, dimethylene thioether, lower alkenylene, phenylene and pyridine groups, $n$ represents a number selected from the group consisting of 0 and 1, the step which comprises heating 1-(3'-halogen-4'-methylphenyl)-piperazines with a member selected from the group consisting of dicarboxylic acid and the lower alkyl esters, inner anhydrides and chlorides thereof at a temperature within the range of about 5° to 200° C.

No references cited.